US005561528A

United States Patent [19]
Johnson et al.

[11] Patent Number: 5,561,528
[45] Date of Patent: Oct. 1, 1996

[54] FORMS ON DEMAND PRINTING

[75] Inventors: Allen P. Johnson, Lexington; Christy A. West, Versailles; Edward W. Yohon, Jr., Lexington, all of Ky.

[73] Assignee: Lexmark International, Inc., Greenwich, Conn.

[21] Appl. No.: 285,574

[22] Filed: Aug. 3, 1994

[51] Int. Cl.⁶ .............................. H04N 1/21; G06F 15/00
[52] U.S. Cl. ............................................. 358/296; 395/115
[58] Field of Search ..................................... 358/296, 401, 358/444, 448; 395/115, 116

[56] References Cited

U.S. PATENT DOCUMENTS

| | | | |
|---|---|---|---|
| 5,222,200 | 6/1993 | Callister et al. | 395/112 |
| 5,239,621 | 8/1993 | Brown, III et al. | 395/115 |
| 5,461,705 | 10/1995 | Wakabayashi et al. | 395/115 |
| 5,509,115 | 4/1996 | Butterfield et al. | 395/116 X |

*Primary Examiner*—Peter S. Wong
*Assistant Examiner*—Eric Frahm
*Attorney, Agent, or Firm*—John A. Brady

[57] ABSTRACT

Printer (1) is provided with a mode to print forms without reference to or interruption of a host computer and with immediate printing of one or more of the forms. Page data for the forms is stored in flash memory (21) in a high level printer language. At initiation of the forms mode at least the first listed document is immediately prepared by the control data processor (17) of the printer in bit mapped form for printing. Documents are listed on the control panel by name for ready selection for printing.

5 Claims, 3 Drawing Sheets

FORMS ON DEMAND PRINTING

TECHNICAL FIELD

This invention relates to the repetitive printing of stored data under the control of an operator of a printer which both stores the data and prints the data.

BACKGROUND OF THE INVENTION

Many businesses purchase personal printers to generate custom forms which are used in their daily operations. Examples of such forms might include a bank's application for an automobile loan, a department store's application for a store credit card, or a government office or agency's description of the types and prices of services offered by the office or agency. Today, businesses using printers to generate these custom forms are required to connect a host computer such as a personal computer to the printer each time the form is generated.

The involvement of the host computer in the process of generating the form can vary from setup to setup. In the simplest of setups, the form data is stored in the printer and the host is required to issue the appropriate commands to select a particular form and instruct the printer to print the form. Other setups require that the form data be stored on the host. In this type of setup, the host must select a form, and send the form data to the printer; the printer does not distinguish this type of print job from other print jobs sent by the host.

In an existing, prior art printer sold by the assignee of this application as the 4037 Page Printer, the printer has what is termed the "Retail" mode. In this mode the printer is placed in a state at which the printing of a single, predetermined document is the only printing function which is performed. The document constitutes a descriptive brochure. Thus, prospective customers in a retail sales environment can activate the printing of only that form by an entry at the control panel of the printer stating "Press any key for one page demo". Printing of the brochure takes a long time, since the brochure page was complex and each printing of the brochure required the final bit map to be prepared prior to printing. When in the Retail mode, the printer enters the Retail mode each subsequent time it is turned on. The Retail mode is activated by the special entry of pressing and holding a predetermined key during turn on. The same special entry of pressing and holding the predetermined key during turn on returns the printer to normal printing mode. When in the Retail mode the operator cannot access normal printer functions, such as select menu items on the panel or send print data from a host computer.

In an existing, prior art printer sold since early 1994 by the assignee of this application as the 4039 plus laser printer, individual forms can be printed, each after multiple entries to the control panel. At least four buttons entries on the control panel are pressed to display on the control panel a list of forms (specifically, these entries are "Menu", "Tests", "More" and "Print Demo"). Then a print key is depressed to print the selected form. The selected form is only then formatted to a bit map. After it is printed, the control panel is returned to the normal printing state and printing of the same or another form required the multiple key entries and the formatting of the document printed.

This invention is operative in a system in which a page description is received in a high level printer language. Such printer language are discussed in some detail in U.S. Pat. No. 5,222,200 to Callister et al, entitled Automatic Printer Data Stream Language Determination, and assigned to the assignee of this invention.

This invention employs the storing of forms in flash memory. Such an operation is a subject of U.S. Pat. No. 5,239,621 to Brown III et al, entitled Printer With Flash Memory, and assigned to the assignee of this invention.

DISCLOSURE OF THE INVENTION

The printer in accordance with this invention has non-volatile memory, preferably flash memory, for storing documents to be printed in their high level language, which may be a page description language such as PostScript (trademark of Adobe Systems Incorporated) or an ASCII based-language such as PCL (trademark of Hewlett-Packard Co.), or a graphics language. The printer is controlled by standard electronic data processing including a microprocessor arid optionally combinational logic, typically in an application specific integrated circuit, termed an ASIC. The electronic control has two modes, a normal mode in which printing is by receiving data and printing it in normal or conventional fashion. The electronic control has a forms mode, selected under operator control or from incoming control signals, which facilitates printing of the stored documents. Such documents are stored in the non-volatile memory with data associated with them designating them as forms. As a pad of the second mode, the forms are prepared upon initiation of the forms mode in bit map configuration by the electronic control in the normal operation for the printer. As many forms as permitted by available memory are so prepared. In such bit map form they are ready for immediate printing. Preferably, they are also stored in high speed memory of the control system, commonly known as cache memory, which typically is standard DRAM (dynamic random access memory). Each form is associated with a unique name as part of the entering of data describing the form into the non-volatile memory. In the second mode the control system displays the unique names of forms on an operator panel so that the forms can be selected. Upon selection of a form and its printing, the control system again displays and is prepared to immediately print at least one form on the displayed list. Preferably the second mode has a submode in which normal printing may be readily accessed from the control panel and a submode in which normal printing is prevented, as it is with the previous Retail mode.

BRIEF DESCRIPTION OF THE DRAWING

The details of this invention will be described in connection with the accompanying drawing, in which.

BEST MODE FOR CARRYING OUT THE INVENTION

Figure 1:
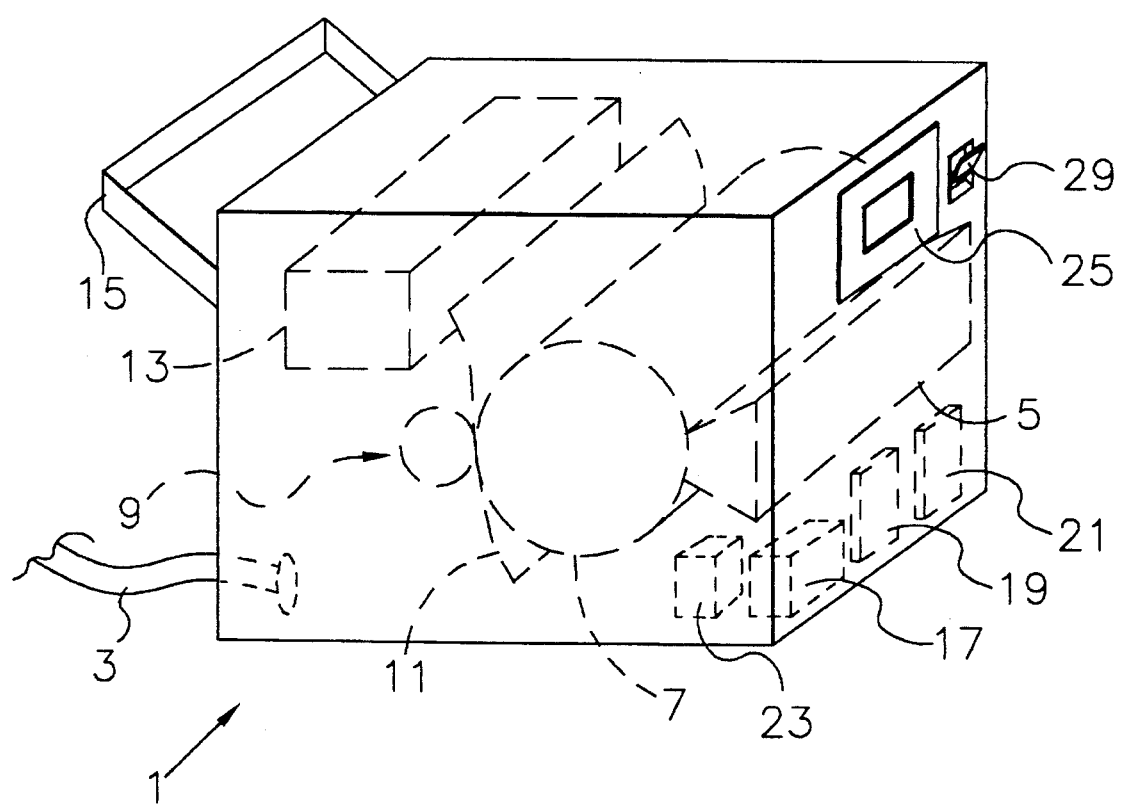
FIG. 1 is illustrative of a printer in accordance with this invention.

FIG. 1 illustrates a printer 1 in accordance with this invention having the ability to print forms on demand without significant delay at operator input without requiring involvement of a host computer. Of course, few businesses currently operate in an environment where a printer is not connected to some host computer. If anything, the opposite is true, multiple host computers are connected to one printer. However, when a printer 1 is in its mode for forms on demand, the operator's host computer may operate independently of printer 1, for example the host may process data associated with an application which is different from the application associated with the custom forms of the operators' business. The operator prints forms on printer 1 without interrupting the host computer. Since printer 1 has the capability of printing the form independent of the host computer, the operator can save a significant amount of time since the need to exit or interrupt one application and start another is not required. This capability may be ideal, for example, for a loan officer who has daily office responsibilities as well as responsibilities for interviewing perspective loan applicants. When a loan applicant walks up to the officer's desk, the officer is no longer required to interrupt an application program currently in use to print a loan application.

Page description information is received by printer 1 in a standard manner from a communications cable 3. Printer 1 may be any suitable printer with respect to normal imaging by composing bit images from received data describing images in a language. For illustrative purposes printer 1 is shown suggestive of an electrophotographic printer having an optical system 5 operative on drum 7. Drum 7 transfers images defined by optical system 5 at transfer station 9 to paper 11. The image is fixed, typically by heat, at fixing station 13, and the finished printer page is delivered to output tray 15.

Data processor 17 in printer 1 controls operation of printer 1. Typically, data processor 17 is a microprocessor, often with one or more ASIC combinational logic circuits to speed certain operations. As part of this operation, information received on cable 3 in a high level language is interpreted by data processor 17 to create a bit map of the page to be printed. For example, printer languages typically describe characters of the alphabet in an ASCII code. The form of the character is stored in fonts and these fonts are used to define the final bit map. Other information may be in the form of vectors. Interpretation of such high level languages is now entirely standard and will not be elaborated on further as its use in this invention is straightforward. The 4037 Page Printer sold commercially by the assignee of this invention represents a printer which this invention may employ in its existing form except for the forms on demand elements as described. In fact, the 4037 does have the "Retail" mode discussed in the forgoing under the heading "Background of the Invention."

Information received on cable 3, as well as other information, is stored in volatile memory 19, a standard DRAM, or non-volatile memory 21, under the control of data processor 17. Memory 21 is preferably flash memory as that provides size and functionality equivalent to the standard volatile memory, such as DRAM, at acceptable cost. A third memory 23 represents standard NVRAM (non-volatile random access memory). NVRAM is expensive and relatively slow, and its use is limited accordingly. It is used primarily to store status and control information, including information defining the mode of the printer 1 in accordance with this invention.

Figure 2:
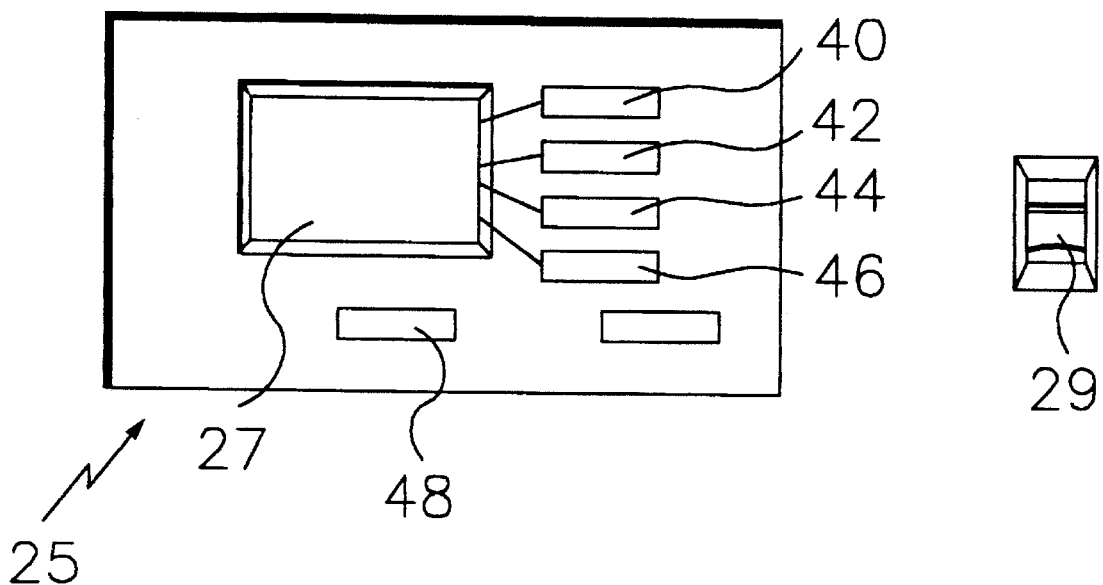
FIG. 2 shows the control panel of the printer with the power switch off.

Printer 1 has a control panel 25 with a middle display 27 and an off-on power switch 29. FIG. 2 shows the display 27 as it appears prior to turn of by switch 29. The display is blank. It has four buttons on the right from the top, 40, 42, 44, and 46. System control by data processor 17 responds to the following to enter the forms on demand mode permitting operator intervention (i.e., not the Retail mode):

1) Key 44, the third key from the top is depressed and held by an operator of printer 1.
2) While key 44 is depressed, switch 29 is turned to the power on position.

Once in this mode, the operator may simply press ready key 48 for data processor 17 to return to normal printing mode (other controls, such as a reset entry, are also operative). Absent depressing of key 48 or other override entry, printer 1 is in the forms on demand mode described more fully below.

Figure 3:
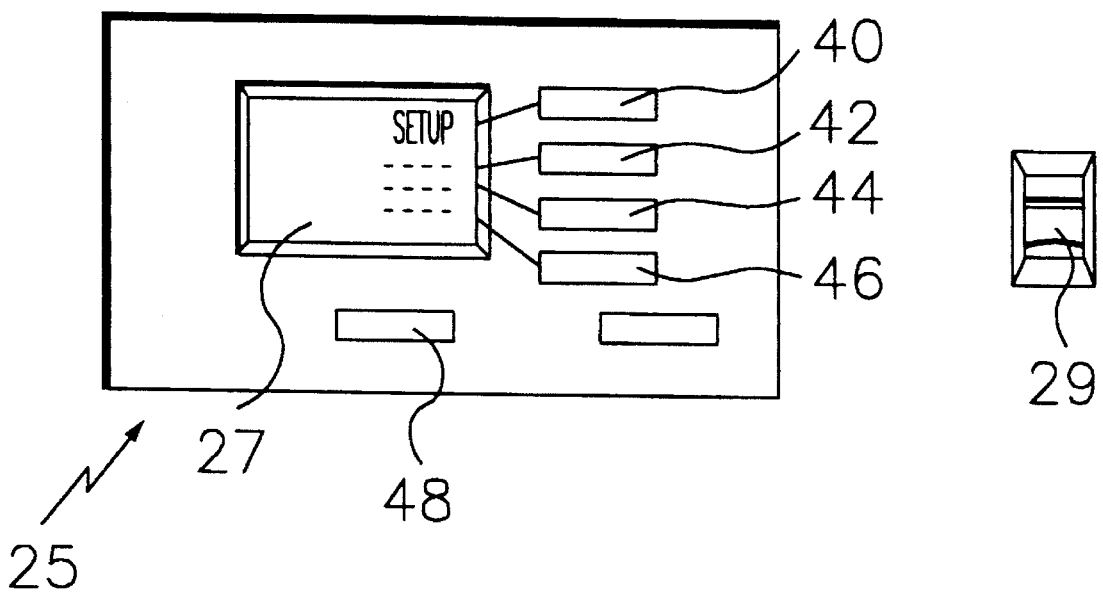
FIG. 3 shows the control panel of the printer with its initial display at turn on to the normal printing mode.
Figure 4:
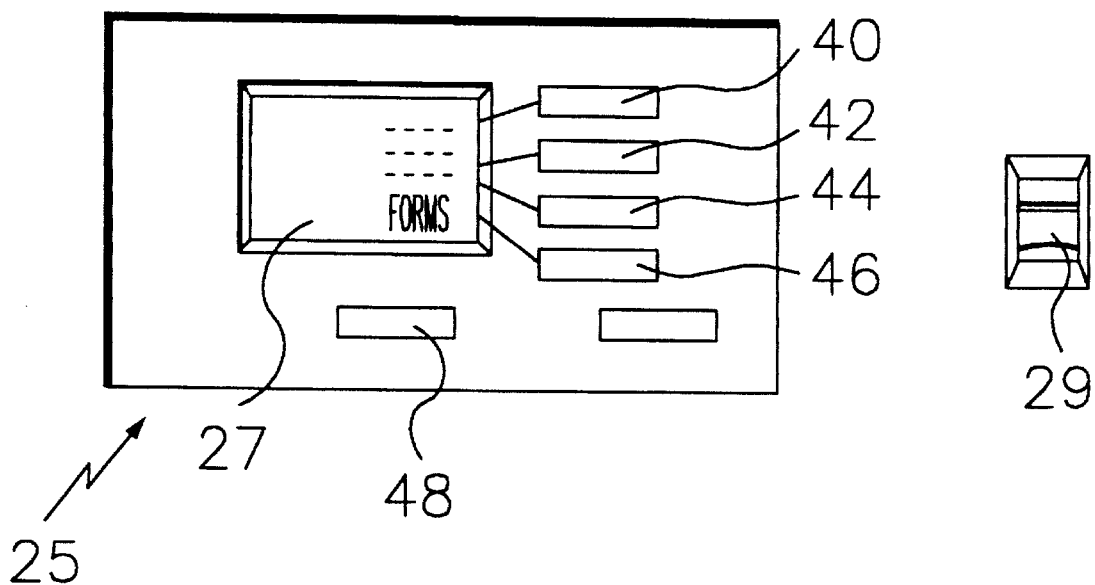
FIG. 4 shows the control panel of the printer with the display reached by the control button opposite the word "Setup" as it appears in FIG. 3.

Another entry to this form mode is from the control panel 25. System control by data processor 17 responds to the following:

1) Printer 1 is turned on by switch 29. (Printer 1 enters normal printing mode when that was the mode at the immediately previous turn off by switch 29. If the power-on default is not normal printing, this entry is not applicable until printer 1 is brought to normal printing mode.)
2) Display 27 then has the term "SETUP" next to key 40 as shown in FIG. 3. Key 40 is depressed.
3) Display 27 then has the term "FORMS" next to key 46, as shown in FIG. 4. Key 46 is depressed. Printer 1 enters the forms mode.

Only when the forms on demand mode is entered by the key 44 at turn on, NVRAM 23 stores data designating that as the power-on default, to which data processor responds at subsequent turn-on. This is reversed by once again depressing key 44 while turning on switch 29, at which time data in NVRAM is changed to that responded to by data processor 17 to bring printer 1 at turn on to the normal printing mode.

Figure 5:
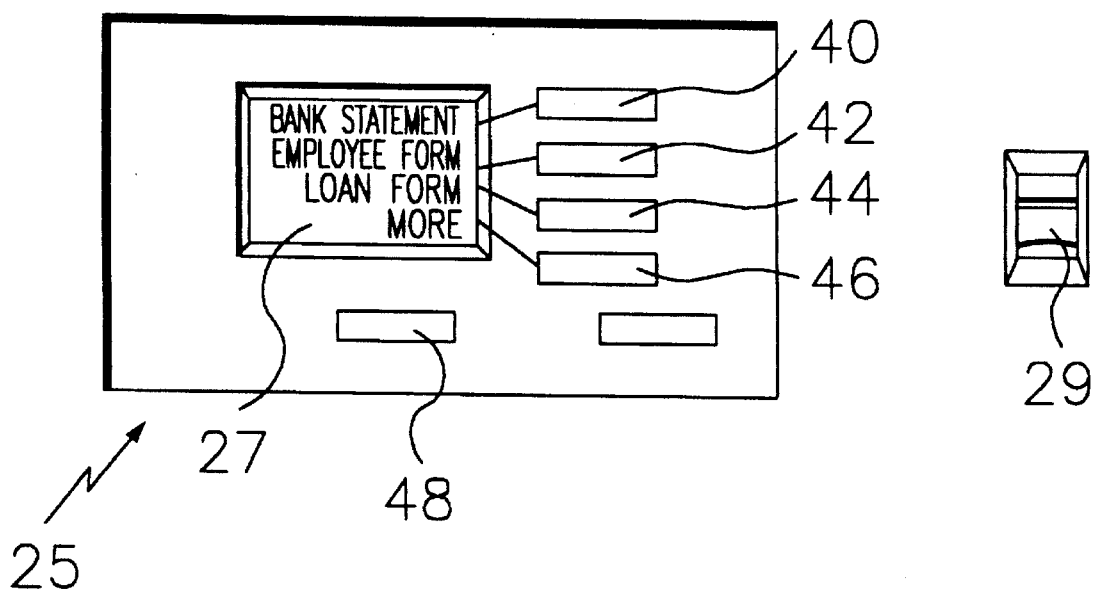
FIG. 5 shows the control panel of the printer with its display when in the forms mode.

FIG. 5 shows the display 27 after entry in the forms mode in which more than four forms are stored as forms in non-volatile memory 21 of printer 1. The names of three forms are displayed next to buttons 40, 42 and 44 respectively. The term "MORE" appears next to button 46, which indicates that further forms will be displayed by pressing of button 44.

Upon entry of the forms mode, either by turn on with switch 29 or from control panel 25 as just described, printer 1 under control of data processor 17 immediately effects normal bit mapping of the form in non-volatile memory 21 to appear first (next to key 40) on display 27. That bit mapped data is stored in DRAM 19. The other forms in the order they appear on display 27 are similarly bit mapped and stored as the available space in memory 19 permits.

To print one of the forms, for example the "EMPLOYEE FORM" indicated in FIG. 5, button 42, the button next to that form, is pressed by the operator. Printer 1 under control of data processor 17 prints the form in normal fashion while the word "BUSY" is caused to appear on display 27. In this mode operator intervention to interrupt printing is available to the operator to the same extent as in normal printing.

The employee form may not be in readily accessible memory 19 ("cache" being a term for memory which is readily accessible to its associated data processor) because memory 19 could not store it after storing the first form on the list of display 27, bank statement. In this event printing is delayed while data processor 17 prepares the employee form in a bit map as required for printing. In the forms mode one preferred alternative stores the complete new form being printed; in the illustration the employee form is then stored in cache memory 19. This is a recognition that the printing of one copy suggests that the same form is the most probable form to be printed the next time a form is printed. Thus, if the next key after printing employee form is again key 42 to call for a second employee form, printing will begin immediately from the bit mapped date in cache memory 19. A second preferred alternative reformats the first form on the display 27 immediately after printing whichever forms is printed. This is a recognition that the operator may wish to know with certainty which form can be immediately printed, as when the printer has multiple operators.

The "Retail" submode of the forms mode is not entered from the control panel 25 in this preferred embodiment. It is only entered by predetermined code entered in non-volatile memory 21. This is by special entry at the host computer. Data processor 17 recognizes that code at turn on and responds by bringing printer 1 to the Retail mode.

Once in the Retail mode, it can be exited to the normal printing mode by the follows:

1) Key 42 is depressed and held.
2) While key 42 is depressed, switch 29 is turned to the power on position.

Until exit of the Retail mode, at each turn on data processor 17 brings printer 1 to the Retail mode by reference to default data stored in non-volatile memory 21.

Except that it can only be entered by coding in the non-volatile memory 21, the Retail mode as just described does not differ from that of the prior printer mentioned under the heading "Background of the Invention." In accordance with this invention, the bit map of forms is made immediately on entering the Retail mode and stored in cache memory 19 as described for the forms on demand mode. Additionally, in the Retail mode the content of display 27 may be changed from "Press any key for one page demo", to a list of brochures like the list of forms in the forms on demand mode.

The preparation of forms and brochures may be done by a number of application programs and forms no part of this invention. The forms are typically prepared from a blank condition by an operator creating a wholly or largely unique form using a personal computer. Alternatively, the form may be scanned from a copy. In any event, the form, typically in a high level language as previously mentioned, comes to exist and may be transmitted to printer 1 by signals on cable 3. Such transfer, as will be described immediately following, is conventional and forms no part of this invention. A special software utility for the host computer may be provided to facilitate transfer. Printer 1 under control of data processor 17 responds to the following commands to enter forms into non-volatile memory 21:

1) Switch 29 is turned on and printer 1 is brought to the normal printing status.
2) Conventional driver software suitable to printer 1 basic operation is employed at a host computer applying the signals to cable 3.
3) A unique command for storing files is sent on cable 3.
4) A unique command for opening and naming a file containing a form is sent, the name being that which will appear on display 27.
5) With the form prepared by an application program, the "print to file" entry is made to the application program. The user then instructs the application to print the document in the normal manner. The print to file designation causes the application to create the form on the hard disk on the host computer. Once this operation is complete, the user exits the application and sends the file to the printer.
6) A unique command is sent to close the file.
7) A unique command is sent to designate storage of the form in non-volatile memory 21 as a form. Step 4 has designed the data so stored as a form with the name assigned.

The foregoing procedure is repeated for each form to be stored in non-volatile memory 21.

Final printing from the bit map preferably is modified by known techniques to remove stair step appearance of slanted lines, known as enhancement of resolution, by adjustment made based on the final bit map.

Alternative will be apparent and may be devised within the spirit and scope of this invention.

What is claimed is:

1. A printer comprising:

electronic data processing means to control printing of said printer, said means to control printing having a selectable first mode to print documents from data received after selection of said first mode and having a selectable second mode to print documents from data stored in non-volatile memory in accordance with predetermined designation data, imaging means to print an image of data from a bit map of said image, non-volatile electronic memory to store information to be printed, means to select said first mode and means to select said second mode, said means to control printing responding to said selection of said second mode to prepare a bit map for printing of predetermined data in said non-volatile memory located by said designation data so that the printing by said printer of a document represented by said predetermined data may begin without substantial delay when said document is selected for printing, and means operative in said second mode to permit selection of documents in said prepared bit map to be printed by said printer.

2. The printer as in claim 1 in which said printer also comprises an operator control panel and random access memory, said printer continues the selection of said first mode and said second mode through power off and then power on, said prepared bit map is selectable for printing from said control panel and said prepared bit map is stored in said random access memory for use at said printing of said document.

3. A printer comprising:

an operator panel display, electronic data processing means to control printing of said printer and displays on said operator panel display having a first selectable mode to print documents from data received after selection of said first mode and having a second selectable second mode to print documents from data stored in non- volatile memory, non-volatile electronic memory to store data to be printed, means to receive from a host computer data defining a plurality of documents and predetermined designation data associated with each said defined document unique to each said document, and means to store said data defining documents in said non-volatile memory, said means to control printing in said second mode displaying on said display a list of designations for said documents associated with said designation data and causing printing of a selected one of said documents in response to an input unique to said displayed designation for said selected document, said means to control printing after said printing of said document again displaying on said display a list of designations for said documents associated with said designation data and again causing printing of a selected one of said documents in response to an input unique to said display designation for said selected document.

4. The printer as in claim 3 in which said means to control printing responds to said selection of said second mode to prepare a bit map for printing of said data defining a document in said non-volatile memory so that the printing of a document represented by said predetermined data may begin without substantial delay in response to said input unique to said displayed designation.

5. The printer as in claim 4 in which said printer also comprises an operator control panel and a random access memory, said printer continues the selection of said first mode and said second mode through power off and then power on, said prepared bit map is selectable for printing from said control panel, and said prepared bit map is stored in said random access memory.

* * * * *